United States Patent
Mnih et al.

(10) Patent No.: US 9,704,068 B2
(45) Date of Patent: Jul. 11, 2017

(54) SYSTEM AND METHOD FOR LABELLING AERIAL IMAGES

(71) Applicant: Google Inc., Mountain View, CA (US)

(72) Inventors: Volodymyr Mnih, London (GB); Geoffrey E. Hinton, Toronto (CA)

(73) Assignee: Google Inc., Mountain View, CA (US)

( * ) Notice: Subject to any disclaimer, the term of this patent is extended or adjusted under 35 U.S.C. 154(b) by 238 days.

(21) Appl. No.: 13/924,320

(22) Filed: Jun. 21, 2013

(65) Prior Publication Data
US 2013/0343641 A1    Dec. 26, 2013

Related U.S. Application Data

(60) Provisional application No. 61/663,297, filed on Jun. 22, 2012.

(51) Int. Cl.
   *G06K 9/62*      (2006.01)
   *G06K 9/00*      (2006.01)
   *G06T 7/11*       (2017.01)
   *G06T 7/143*    (2017.01)

(52) U.S. Cl.
CPC .......... *G06K 9/6269* (2013.01); *G06K 9/0063* (2013.01); *G06K 9/00651* (2013.01); *G06K 9/6277* (2013.01); *G06T 7/11* (2017.01); *G06T 7/143* (2017.01); *G06T 2207/10032* (2013.01); *G06T 2207/20084* (2013.01); *G06T 2207/30181* (2013.01)

(58) Field of Classification Search
CPC ...... G06T 9/002; G06F 15/18; G06K 9/00651
USPC ................... 382/155–157, 159, 181, 224
See application file for complete search history.

(56) References Cited

U.S. PATENT DOCUMENTS

| | | | |
|---|---|---|---|
| 2004/0034473 A1* | 2/2004 | Kim et al. ................. 702/5 |
| 2006/0078205 A1* | 4/2006 | Porikli et al. .............. 382/204 |
| 2007/0014488 A1* | 1/2007 | Chen et al. ................ 382/294 |
| 2010/0040285 A1* | 2/2010 | Csurka et al. ............. 382/170 |
| 2010/0265267 A1* | 10/2010 | Schaepe et al. ........... 382/100 |
| 2011/0243450 A1* | 10/2011 | Liu .................. G06K 9/00577 382/190 |
| 2011/0280453 A1* | 11/2011 | Chen ................ G06T 7/0046 382/113 |

OTHER PUBLICATIONS

Volodymyr Mnih and Geoffrey E. Hinton, "Learning to Detect Roads in High-Resolution Aerial Images", Springer-Verlag Berlin Heidelberg, Proceedings of the 11th European Conference on Computer Vision (ECCV), Sep. 2010, pp. 210-223.*

Neil D. Lawrence and Bernhard Schölkopf, "Estimating a Kernel Fisher Discriminant in the Presence of Label Noise", Proceedings of the Eighteenth International Conference on Machine Learning (ICML), 2001, pp. 306-313.*

(Continued)

*Primary Examiner* — Eric Rush
(74) *Attorney, Agent, or Firm* — Fish & Richardson P.C.

(57) ABSTRACT

A system and method for labelling aerial images. A neural network generates predicted map data. The parameters of the neural network are trained by optimizing an objective function which compensates for noise in the map images. The function compensates both omission noise and registration noise.

15 Claims, 3 Drawing Sheets

(56) References Cited

OTHER PUBLICATIONS

Dollar, et al., "Supervised learning of edges and object boundaries," In *Proceedings of the 2006 IEEE Computer Society Conference on Computer Vision and Pattern Recognition*, pp. 1964-1971, 2006.
Frey and Jojic, "Estimating mixture models of images and inferring spatial transformations using the EM algorithm," In *Proceedings of the IEEE Conference on Computer Vision and Pattern Recognition*, pp. 416-422, 1999.
He and Zemel, "Learning hybrid models for image annotation with partially labeled data," In *Advances in Neural Information Processing Systems*, pp. 625-632, 2008.
Hinton, et al., "A fast learning algorithm for deep belief nets," *Neural Computation*, 18:1527-1554, 2006.
Kavukcuoglu et al., Learning convolutional feature hierarchies for visual recognition. In *Advances in Neural Information Processing Systems*, pp. 1-9, 2010.
Kluckner and Bischof, "Semantic classification by covariance descriptors within a randomized forest," In *Computer Vision Workshops (ICCV)*, pp. 665-672, IEEE, 2009.
Kluckner, et al., "Semantic classification in aerial imagery by integrating appearance and height information," In *ACCV*, vol. 5995 of *Lecture Notes in Computer Science*, pp. 477-488, Springer, 2010.
Krizhevsky, "Convolutional deep belief networks on CIFAR-10," Technical report, University of Toronto, 9 pages, 2011.
Lee, et al., "Convolutional deep belief networks for scalable unsupervised learning of hierarchical representations," In *Proceedings of the 26th International Conference on Machine Learning*, pp. 609-616, 2009.
Mayer, et al., "Object extraction in photogrammetric computer vision," *ISPRS Journal of Photogrammetry and Remote Sensing*, 63(2):213-222, 2008.
Mnih and Hinton, "Learning to detect roads in high-resolution aerial images, "In *Proceedings of the 11th European Conference on Computer Vision (ECCV)*, Sep. 2010, 14 pages.
Nair, et al., "Rectified linear units improve restricted Boltzmann machines," In *ICML*, pp. 807-814, 2010.
Pal, et al., "Putting semantic information extraction on the map: noisy label models for fact extraction," In *Sixth International Workshop on Information Integration on the Web*, pp. 80-85, 2007.
Wiedemann, et al., "Empirical evaluation of automatically extracted road axes," In *Empirical Evaluation Techniques in Computer Vision*, pp. 172-187, 1998.

\* cited by examiner

SYSTEM AND METHOD FOR LABELLING AERIAL IMAGES

TECHNICAL FIELD

The following relates generally to the labelling of aerial images with map data.

BACKGROUND

Information extracted from photographs of the earth's surface that were taken by airborne sensors has found applications in a wide range of areas including urban planning, crop and forest management, disaster relief, and climate modeling. Relying on human experts for extracting information from aerial imagery is both slow and costly, so automatic aerial image interpretation has received much attention in the remote sensing community. So far, there are only a few, semi-automated systems that operate in limited domains.

In machine learning applications, aerial image interpretation is usually formulated as a pixel labelling task. The goal is to produce either a complete semantic segmentation of an aerial image into classes such as building, road, tree, grass, and water or a binary classification of the image for a single object class. In both scenarios, the availability of accurately labelled data for training tends to be the limiting factor. Hand-labelled data tends to be reasonably accurate, but the cost of hand-labelling and the lack of publicly available hand-labelled datasets strongly restrict the size of the training and test sets for aerial image labelling tasks.

At present, maps of many major cities not only provide the locations of most roads and parks, but also the locations of buildings. Thus, one alternative to using hand-labelled data is to use maps from projects such as OpenStreetMap™ for constructing the labels. For object types covered by these maps, it is now possible to construct datasets that are much larger than the ones that have been hand-labelled. While the use of these larger datasets has improved the performance of machine learning methods on some aerial image recognition tasks, datasets constructed from maps suffer from two types of label noise: omission noise and registration noise. FIG. 1 shows an example of omission noise and registration noise in a mapping application.

Omission noise occurs when an object that appears in an aerial image does not appear in the map. This is the case for many buildings (even in major cities) due to incompleteness of the maps. It is also true for small roads and alleys, which tend to be omitted from maps, often with no clear criterion for when they should be omitted.

Registration noise occurs when the location of an object in a map is inaccurate. Such errors are quite common because not requiring pixel level accuracy makes maps cheaper to produce for human experts without significantly reducing their usefulness for most purposes.

The presence of these kinds of errors in the training labels significantly reduces the accuracy of classifiers trained on this data.

It is an object of the present invention to mitigate or obviate at least one of the above disadvantages.

SUMMARY OF THE INVENTION

In one aspect, a system for labelling aerial images is provided, the system comprising a neural network for generating predicted map data wherein the parameters of the neural network are trained by optimizing an objective function which compensates for noise in the map images.

BRIEF DESCRIPTION OF THE DRAWINGS

Embodiments will now be described by way of example only with reference to the appended drawings wherein.

DETAILED DESCRIPTION OF THE DRAWINGS

Figure 1:
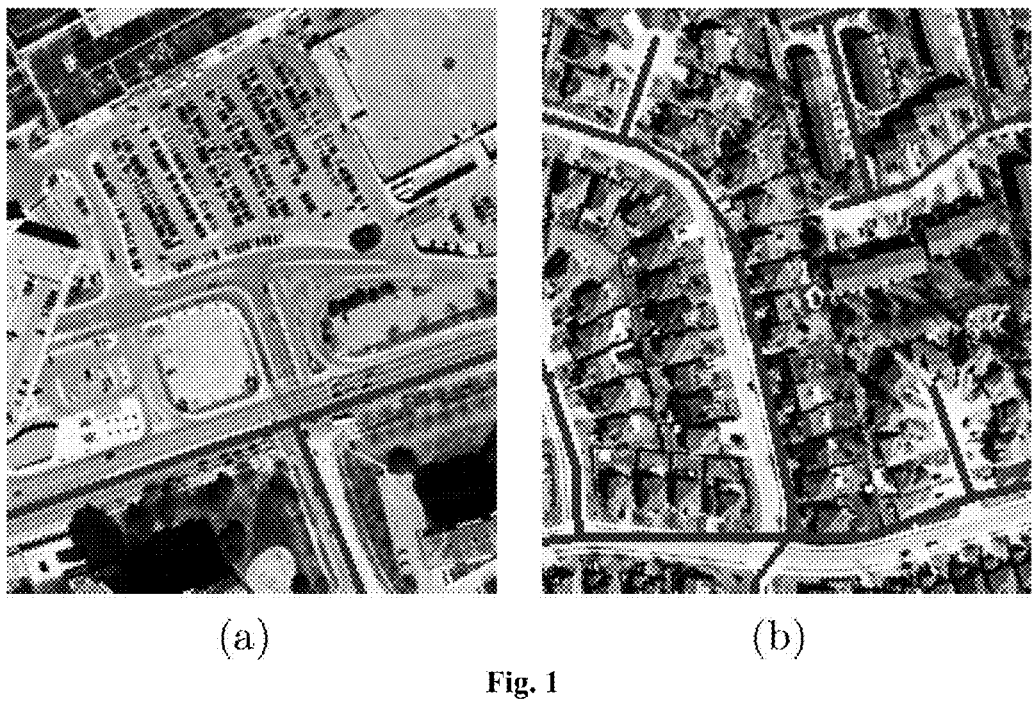
FIG. 1 is an example of omission noise and registration noise in a mapping application.

Embodiments will now be described with reference to the figures. It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It will also be appreciated that any module, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Any application or module herein described may be implemented using computer readable/executable instructions that may be stored or otherwise held by such computer readable media.

When training a system to label images, the amount of labeled training data tends to be a limiting factor.

The present invention provides a system and method for labelling aerial images. The invention provides a training unit for reducing and compensating omissions noise and registration noise in map images. A neural network generates predicted map data. The parameters of the neural network are trained by optimizing an objective function which compensates for noise in the map images. The function compensates both omission noise and registration noise.

Figure 2:
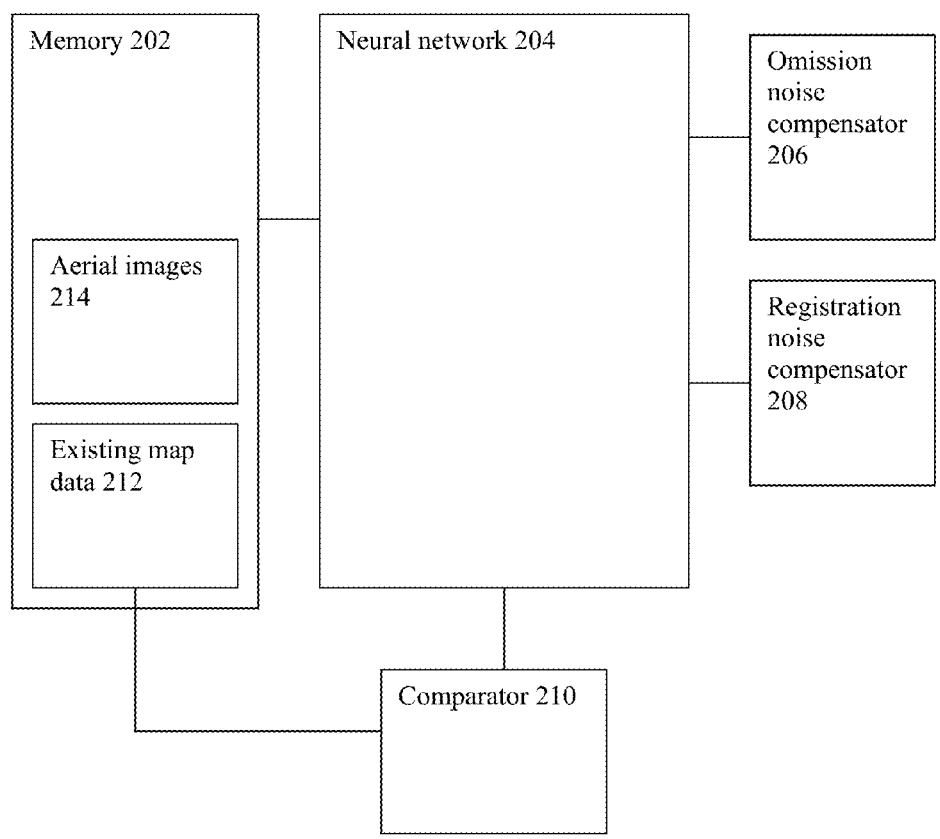
FIG. 2 is a system in accordance with the present invention.

Referring now to FIG. 2, the training unit comprises a memory 202, a neural network 204, an omission noise compensator 206, a registration noise compensator 208 and a comparator 210. The parameters of the neural network are selected by reducing a negative log likelihood function, or another objective function, generated by the omission noise compensator and registration noise compensator. The neural network can be used to generate map data during and after training.

The memory stores existing map data 212 and corresponding aerial images 214 of a training set. The neural network is trained by adjusting a loss function, which models or compensates the omission noise and registration noise in the map image, to produce output map data that closely corresponds to the existing map data. The degree of such correspondence is determined by inputting the output map data and existing map data to a comparator.

By adjusting the neural network based on the degree of correspondence and to implement the omission noise compensator and registration noise compensator, the training process for the neural network learns to label aerial images from existing maps that may provide abundant labels, notwithstanding that such existing maps may be incomplete, poorly registered or both.

In one example, the neural network may comprise an input layer, output layer and three hidden layers, although it will be appreciated that any number of hidden layers may be included in the neural network. The neural network is trained using a robust loss function for reducing the effect of omission errors on a resulting classifier and for compensating omission noise and registration noise in the training data. Initializing neural networks using unsupervised learning methods is believed to improve performance on a variety of vision tasks and, in the present disclosure, unsupervised pretraining is used to initialize the deep neural network.

An exemplary aerial image labeling task comprises binary labels, where all pixels are labelled as either belonging to an object class of interest with 1's or all other pixels with 0's. Road and buildings are two examples of such object classes, however it will be appreciated that the present invention is operable for many other classes.

In a high-resolution aerial image, a single pixel can represent a square patch of land that is anywhere between several meters and tens of centimeters wide. At the same time one is typically interested in detecting roads in a large area such as an entire town or city. Hence, one is generally faced with the problem of making predictions for millions if not billions of map pixels based on an equally large number of satellite image pixels.

For these reasons, the probability that $\tilde{M}_{i,j}=1$ has typically been modeled as a function of some relatively small subset of S that contains location (i,j) instead of the entire image S. If S is an aerial/satellite image and $\tilde{M}$ is the corresponding map image of equal size produced from the given map, $\tilde{M}_{i,j}=1$ whenever the pixel at location (i,j) contains the object of interest and $\tilde{M}_{i,j}=0$ otherwise.

The goal is to learn to predict patches of map M from patches of S. Following a probabilistic approach, the distribution may be modelled as:

$$P(n(\tilde{M}_{i,j}, w_m) | n(S_{i,j}, w_s)), \quad (1)$$

where $n(I_{i,j}, w)$ is the w×w patch of image I centered at location (i,j). Typically $w_m$ is set to be smaller than $w_s$ because some context is required to predict the value of a map pixel. While $w_m$ can be set to 1 to predict one pixel at a time, it is generally more efficient to predict a small patch of labels from the same context.

The following notation will be used in the present specification. Vectors s and $\tilde{m}$ denote the aerial image patch $n(S_{i,j}, w_s)$ and the map patch $n(\tilde{M}_{i,j}, w_m)$ respectively. Given the work of the present inventors in Mnih, Volodymyr and Hinton, Geoffrey, "Learning to Detect Roads in High-Resolution Aerial Images", Proceedings of the 11$^{th}$ European Conference on Computer Vision (ECCV), September 2010, incorporated by reference herein, conditional independence of the map pixels may be presumed and the map distribution may be modelled as:

$$p(\tilde{m} | s) = \prod_{i=1}^{w_m^2} p(\tilde{m}_i | s). \quad (2)$$

using a neural network. Each $p(\tilde{m}_i|s)$ may be modelled by a Bernoulli distribution whose mean value is determined by the ith output unit of the neural network. This may be referred to as the "noise free" model.

A deep neural network may be used to model the map distribution. The input to the neural network is a $w_s$ by $w_s$ patch of an aerial image encoded in the RGB color space, while the output is a $w_m$ by $w_m$ map patch. The input layer to the neural network contains one input unit for each pixel of each color channel of the aerial image patch, for a total of $3w_s^2$ input units.

The input layer is followed by three hidden layers, although it will be appreciated that any number of hidden layers may be included in the neural network. Each unit in a hidden layer computes a linear combination of some or all units in the previous layer. This linear combination is known as the input to the unit. Each hidden unit computes an output by applying an activation function to its input. All hidden layers of the deep neural network make use of the rectified linear activation function, for which the output is defined as max(0, input). It has been found that rectified linear units typically perform better than logistic units on various image classification tasks and it has further been found that this advantage typically exists on image labeling tasks.

The first two hidden layers in the neural network are locally connected layers, in which each hidden unit is connected to only a subset of the input units.

To precisely define the connectivity pattern, assume that the input units of a locally connected layer make up a $w_{in} \times w_{in}$ image, possibly consisting of multiple channels. The channels can include but are not limited to RGB color channels, an infrared channel, and channels corresponding to other types of electromagnetic radiation. The input image may be covered by evenly spaced filter sites by moving a $w_f \times w_f$ pixel window over the image by a stride of $w_{str}$ pixels vertically and horizontally, for a total of $((w_{in}-w_f)/w_{str}+1)^2$ filters sites. Each site then consists of a $w_f \times w_f$ window pixels which act as the input to f hidden units in the next layer.

Further, each input patch may be preprocessed by subtracting the mean value of the pixels in that patch from all pixels and then dividing by the standard deviation found over all pixels in the dataset. This type of preprocessing may achieve some amount of contrast normalization between different patches.

A different set of f filters of size $w_f \times w_f$ and consisting of the same number of channels as the input image is applied at each filter site. Hence, a single locally connected layer results in $f \cdot ((w_{in}-w_f)/w_{str}+1)^2$ hidden units. The hidden units of one locally connected layer can then act as the input to the next locally connected layer by viewing the hidden units as a square image with f channels and width $(w_{in}-w_f)/w_{str}+1$.

Unlike a convolutional or tiled net, there is no weight-sharing of any kind. While weight-sharing in convolutional architectures is advantageous on smaller datasets because it helps reduce overfitting by restricting the number of parameters, such a restriction is not required in the present invention because the abundance of labels, combined with random rotations, enables the avoidance of overfitting by training on millions of labeled aerial image patches. Like convolutional architectures, the present locally connected architecture may be computationally and statistically more efficient than a fully connected architecture.

The third hidden layer may be fully connected, with each unit connected to every unit in the preceding hidden layer. The output layer consists of $w_p^2$ logistic units for which the output is $1/(1+\exp(-\text{input}))$. Typically, $w_p=w_m$ and each output unit models the probability that the corresponding pixel in the $w_m$ by $w_m$ output map patch belongs to the class of interest.

The values of the parameters such as the number of filters f, their width $w_f$, and stride $w_{str}$ may vary from problem to problem.

As previously mentioned, the parameters of the neural network may be learned by minimizing the negative log likelihood of the training data. For the noise-free model given in (2) the negative log likelihood takes the form of a cross entropy between the patch $\tilde{m}$ derived from the given map and the predicted patch $\hat{m}$, as follows:

$$\sum_{i=1}^{w_m^2} (\tilde{m}_i \ln \hat{m}_i + (1-\tilde{m}_i)\ln(1-\hat{m}_i)). \quad (3)$$

The foregoing objective function may be optimized using mini-batched stochastic gradient descent with momentum or any other suitable optimization method.

The output of the foregoing neural network is image map data. The image map data and the existing map data from memory may be input to the comparator to determine a degree of similarity between them. It is likely there are dissimilarities based in part on noise in the input image.

Omission noise, as shown in FIG. 1, occurs when some map pixels are labeled as not belonging to the object class of interest when they, in fact, do. When trained on data containing a substantial number of such pixels a classifier will be penalized for correctly predicting the value of 1 for pixels affected by omission noise. This will cause a classifier to be less confident and potentially increase the false negative rate.

The omission noise compensator applies a robust loss function that explicitly models asymmetric omission noise in order to reduce its effect on the final classifier to predict the generated map data close to the existing map data.

The noise-free model of the data from (2) assumes that the observed labels $\tilde{m}$ are generated directly from the aerial image s. In order to model label noise, it is assumed that a true, uncorrupted, and unobserved map patch m is first generated from the aerial image patch s according to some distribution $p(m|s)$. The corrupted, observed map $\tilde{m}$ is then generated from the uncorrupted m according to a noise distribution $p(\tilde{m}|m)$.

For simplicity, the omission model assumes that conditioned on m, all components of $\tilde{m}$ are independent and that each $\tilde{m}_i$ is independent of all $m_j$ for $j \neq i$. The observed map distribution that corresponds to this model can then be obtained by marginalizing out m, leading to:

$$p(\tilde{m}|s) = \sum_m p(\tilde{m}|m)p(m|s) \quad (4)$$

$$= \prod_{i=1}^{w_m^2} \sum_{m_i} p(\tilde{m}_i|m_i)p(m_i|s). \quad (5)$$

The noise distribution $p(\tilde{m}_i|m_i)$ may be assumed to be the same for all pixels i, and thus may be determined by parameters:

$\theta_0 = p(\tilde{m}_i=1|m_i=0)$ and, $\theta_1 = p(\tilde{m}_i=0|m_i=1)$.

For modeling omission noise, the relationship $\theta_0 \ll \theta_1$ may be set because the probability that the observed label $\tilde{m}_i$ is 1 given that the true label $m_i$ is 0 should be very close to 0, while the probability that the observed $\tilde{m}_i$ is 0 given that the true label $m_i$ is 1 should still be small but not as close to 0 as $\theta_0$. This model may be referred to as the asymmetric Bernoulli noise model, or the ABN model for short. Other ways of parameterizing $p(\tilde{m}_i|m_i)$ that compensate for omission noise can also be used.

In the noise-free scenario, the map distribution in (2) was modelled directly by a deep neural network. In the noisy setting, the neural network may be used to model the true map distribution $p(m|s)$. Learning can still be done efficiently by minimizing the negative log probability of the training data under the ABN model given in (5). Since the ABN model factorizes over the pixels i and there is only a single Bernoulli latent variable $m_i$ for each pixel i, the derivative of the negative log probability can be found directly. The resulting updates can also be seen as an application of the EM algorithm with an online partial M-step.

Figure 3:
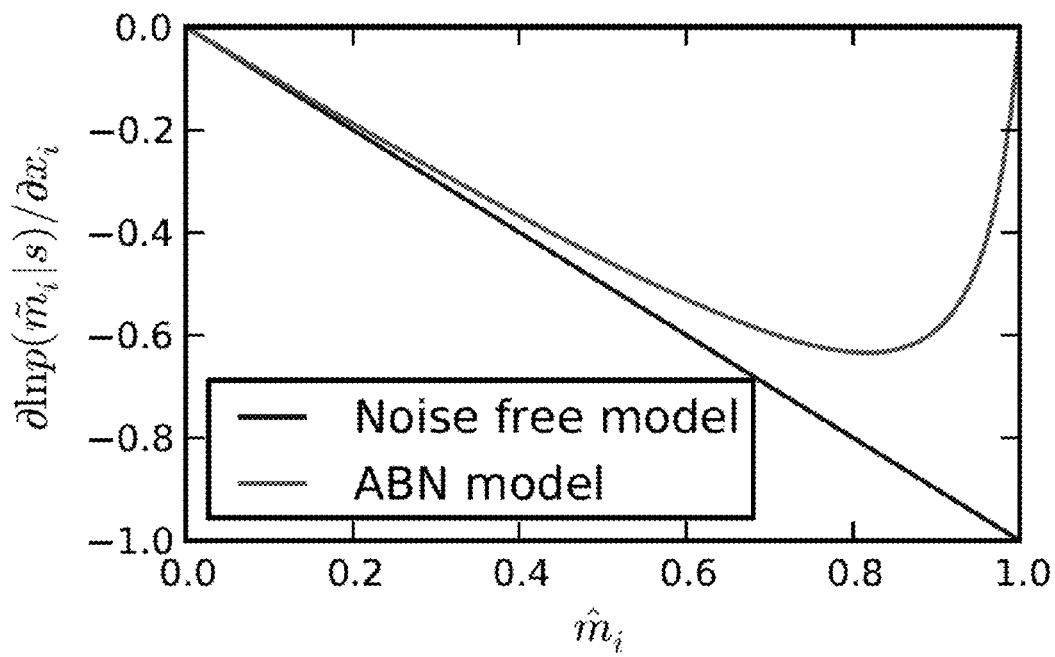
FIG. 3 is an exemplary graphical representation of a model of the present invention.

In the noise-free scenario, the derivative of the negative log probability with respect to the input to the ith output unit of the neural network takes the form $\tilde{m}_i - \hat{m}_i$. The learning procedure predicts $\hat{m}_i$ close to the observed label $\tilde{m}_i$. Under the ABN model, this derivative takes the form $p(m_i=1|\tilde{m}_i, s) - \hat{m}_i$. Hence, the learning procedure predicts $\hat{m}_i$ close to the posterior probability that the unobserved true label $m_i$ is 1. This has the effect that the neural network gets penalized less for making a confident but incorrect prediction. FIG. 3 demonstrates how the derivatives for the noise-free and the ABN models differ as a function of the prediction $\hat{m}_i$. The derivative of the log probability with respect to the input to the ith output unit for varying predictions $\hat{m}_i$ is shown. The observed value $\tilde{m}_i$ is set to 0 while the parameters of the ABN model are $\theta_0=0.001$ and $\theta_1=0.05$. The noise free model penalizes incorrect predictions more than the ABN model, which penalizes incorrect but confident predictions less.

Registration noise occurs when an aerial image and the corresponding map are not perfectly aligned. As shown in FIG. 1, the error in alignment between the map and the aerial image can vary over the dataset and cannot be corrected by a global translation. The registration noise compensator reduces registration errors using local translations of the labels.

The registration noise compensator extends the robust loss function to also handle local registration errors. As with the ABN model, a generative model of the observed map patches is used. On a high level, the generative model works by first generating an uncorrupted and perfectly registered map from the aerial image, then selecting a random subpatch of the true map, and finally generating the observed map by corrupting the selected subpatch with asymmetric noise. More formally, the generative process is as follows:

1) An uncorrupted and perfectly registered true map patch m of size $w_m \times w_m$, is generated from s according to p(m|s). The relationship $W_{m'} = w_m + 2t_{max}$ is set, where $t_{max}$ is the maximum possible registration error/translation between the map and aerial image measured in pixels.

Figure 4:
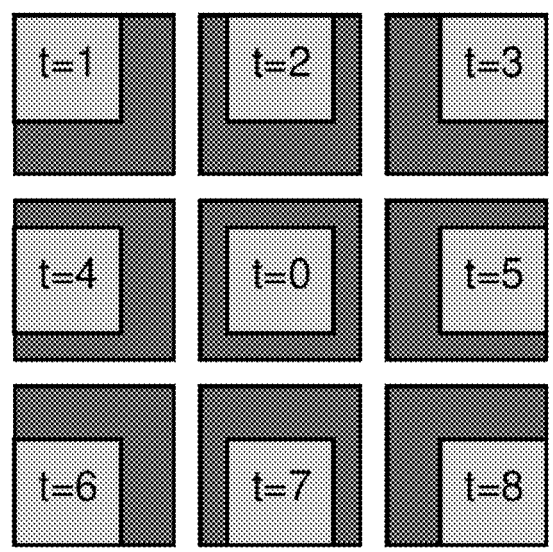
FIG. 4 is a demonstration of a function of the present invention.

2) A translation variable t is sampled from some distribution p(t) over T+1 possible values 0, ..., T. For example, T=8, where t=0 corresponds to no translation while 1, ..., T index 8 possible translations by 0 or $t_{max}$ pixels in the vertical and horizontal directions as well as their combination. This is shown in FIG. 4, wherein for each dark gray patch representing m, the lighter gray subpatch highlights the area cropped by Crop(m,t) for the stated translation parameter t.

3) An observed map is sampled from the translational noise distribution:

$$p(\tilde{m} | m, t) = p(\tilde{m} | \text{Crop}(m, t)) \quad (6)$$

$$= \prod_{i=1}^{w_m^2} p_{ABN}(\tilde{m}_i | \text{Crop}(m, t)_i), \quad (7)$$

where Crop(m,t) selects a $w_m$ by $w_m$ subpatch from the $w_{m'}$ by $w_{m'}$ patch m according to the translation variable t as shown in FIG. 4, and $p_{ABN}(\tilde{m}_i | m_i)$ is the pixelwise asymmetric binary noise model defined in the previous section.

For simplicity it may be assumed that p(t=i)=(1−p(t=0))/T for all i≠0 and p(t) may be parameterized using only a single parameter, $\theta_t = p(t=0)$. Hence, a total of four parameters may be used: $t_{max}$, $\theta_t$, and two parameters needed to define $p_{ABN}(\tilde{m}_i | m_i)$. This generative model may be referred to as the translational asymmetric binary noise model, or the TABN model for short.

The observed map distribution under the TABN model is given by:

$$p(\tilde{m} | s) = \sum_{t=0}^{T} p(t) \sum_{m} p(\tilde{m} | m, t) p(m | s). \quad (8)$$

The parameters p(t) and p(m̃|m,t) may be set using a validation set and the parameters of p(m|s) may be learned by minimizing the negative log likelihood in (8) using the EM-algorithm. The required EM updates can be performed efficiently.

M-Step: Since p(m|s) is modelled by a neural network, a full M-step cannot be performed and instead an approximate partial M-step is performed by a single gradient descent update of the neural network parameters on a mini-batch of training cases. The required derivative of the expected log likelihood is:

$$\frac{\partial}{\partial x_i} \sum_{t} \sum_{m} p(m, t | \tilde{m}, s) \ln p(m | s) = p(m_i = 1 | \tilde{m}, s) - \hat{m}_i$$

where $\hat{m}_i$ is value of the ith output unit of the neural network and $x_i$ is the input to the ith output unit. The updates for all weights of the neural network can be computed from the above equation using backpropagation.

E-Step: The role of the E-step is to compute $p(m_i | \tilde{m}, s)$ for use in the M-step, and this computation can be done in time $T \cdot w_m^2$ by exploiting the structure of the noise model.

$C_t$ is defined to be the set of indices of pixels of m that are cropped for transformation t. Since this set will have $w_m^2$ entries, it may also be used to index into m. By defining:

$$P_t = \prod_{i \in C_t} \left( \sum_{m_i} p(\tilde{m}_i | m_i) p(m_i | s) \right), \quad (9)$$

the observed map distribution can be rewritten as $p(\tilde{m}|s) = \sum_t p(t) \cdot P_t$. Now using the identity $$p(m_i | \tilde{m}, s) = \left[ \sum_{t} \sum_{m_{-i}} p(t) p(\tilde{m} | m, t) p(m | s) \right] / p(\tilde{m} | s), \quad (10)$$

where $m_{-i}$ denotes all entries of m other than i, $p(m_i | \tilde{m}, s)$ can be expressed as $$\left[ \sum_{t} p(t) \cdot P_t \cdot \frac{p(\tilde{m}_i | m_i) p(m_i | s)}{\sum_{m_i} p(\tilde{m}_i | m_i) p(m_i | s)} \right] / \left[ \sum_{t} p(t) \cdot P_t \right]. \quad (11)$$

The width of patches to which the noise model is applied ($W_{m'}$) can be different from the width of patches predicted by the neural network ($w_p$). This enables the decoupling of the size of patch for which registration error is assumed to be constant from the size of predicted patch. For example, $w_{m'} = 4 w_p$. In this case, the $w_{m'} \times w_{m'}$ patch m̃ may be constructed out of 16 non-overlapping $w_p \times w_p$ patches predicted by the neural net. The $w_{m'} \times w_{m'}$ patch of posterior marginals $p(m_i | \tilde{m}, s)$ is then determined as described above, separated into 16 non-overlapping $w_p \times w_p$ subpatches, and the derivatives from all the subpatches backpropagated through the neural network.

In an exemplary embodiment the neural network predicts 16 by 16 patches of map from 64 by 64 patches of aerial image. The first hidden layer may have filter width 12 with stride 4 and 64 filters at each site. The second hidden layer may have filter width 4 with stride 2 and 256 filters at each site. The third hidden layer may have 4096 hidden units.

Although the above has been described with reference to certain specific example embodiments, various modifications thereof will be apparent to those skilled in the art without departing from the scope of the claims appended hereto.

We claim:

1. A method performed by one or more computers, the method comprising:
   training a neural network on training data, wherein the training data includes a plurality of labeled aerial images, wherein the neural network is configured to select a random patch of an input aerial image, modify the random patch with asymmetric noise based on a translation parameter, and generate a respective score for each of a plurality of pixels of the random patch, wherein the translation parameter (i) accounts for potential translation errors for labels in the labeled aerial images, and (ii) parameterizes a translation distribution from which a value of a translation variable is sampled during the training, wherein the respective scores for each of the plurality of pixels represent a probability that the pixel belongs to an object class, and wherein training the neural network on the training data comprises:

minimizing an objective function to adjust values of parameters of the neural network and of the translation parameter, wherein a translation error in a labeled aerial image is a misalignment between the pixels of an object of the object class in the labeled aerial image and the labels for the object in the labeled aerial image.

2. The method of claim 1, wherein the objective function is a negative log likelihood function.

3. The method of claim 1, wherein training the neural network on the training data comprises training a model that generates the labeled aerial images from true labeled aerial images.

4. The method of claim 1, wherein the value of the translation variable defines, for a labeled aerial image, a translation necessary to obtain the labeled aerial image from a corresponding true labeled aerial image.

5. The method of claim 1, wherein the object class is roads, and wherein the respective scores for each of the plurality of pixels represent a probability that the pixel is a part of an image of a road.

6. A system comprising one or more computers and one or more storage devices storing instructions that, when executed by the one or more computers, cause the one or more computers to perform operations comprising:

training a neural network on training data, wherein the training data includes a plurality of labeled aerial images, wherein the neural network is configured to select a random patch of an input aerial image, modify the random patch with asymmetric noise based on a translation parameter, and generate a respective score for each of a plurality of pixels of the random patch, wherein the translation parameter (i) accounts for potential translation errors for labels in the labeled aerial images, and (ii) parameterizes a translation distribution from which a value of a translation variable is sampled during the training, wherein the respective scores for each of the plurality of pixels represent a probability that the pixel belongs to an object class, and wherein training the neural network on the training data comprises:

minimizing an objective function to adjust values of parameters of the neural network and of the translation parameter, wherein a translation error in a labeled aerial image is a misalignment between the pixels of an object of the object class in the labeled aerial image and the labels for the object in the labeled aerial image.

7. The system of claim 6, wherein the objective function is a negative log likelihood function.

8. The system of claim 6, wherein training the neural network on the training data comprises training a model that generates the labeled aerial images from true labeled aerial images.

9. The system of claim 6, wherein the value of the translation variable defines, for a labeled aerial image, a translation necessary to obtain the labeled aerial image from a corresponding true labeled aerial image.

10. The system of claim 6, wherein the object class is roads, and wherein the respective scores for each of the plurality of pixels represent a probability that the pixel is a part of an image of a road.

11. A non-transitory computer-readable storage medium storing instructions, which upon execution by one or more computers, cause the one or more computers to perform operations comprising:

training a neural network on training data, wherein the training data includes a plurality of labeled aerial images, wherein the neural network is configured to select a random patch of an input aerial image, modify the random patch with asymmetric noise based on a translation parameter, and generate a respective score for each of a plurality of pixels of the random patch, wherein the translation parameter (i) accounts for potential translation errors for labels in the labeled aerial images, and (ii) parameterizes a translation distribution from which a value of a translation variable is sampled during the training, wherein the respective scores for each of the plurality of pixels represent a probability that the pixel belongs to an object class, and wherein training the neural network on the training data comprises:

minimizing an objective function to adjust values of parameters of the neural network and of the translation parameter, wherein a translation error in a labeled aerial image is a misalignment between the pixels of an object of the object class in the labeled aerial image and the labels for the object in the labeled aerial image.

12. The non-transitory computer-readable storage medium of claim 11, wherein the objective function is a negative log likelihood function.

13. The non-transitory computer-readable storage medium of claim 11, wherein training the neural network on the training data comprises training a model that generates the labeled aerial images from true labeled aerial images.

14. The non-transitory computer-readable storage medium of claim 11, wherein the value of the translation variable defines, for a labeled aerial image, a translation necessary to obtain the labeled aerial image from a corresponding true labeled aerial image.

15. The non-transitory computer-readable storage medium of claim 11, wherein the object class is roads, and wherein the respective scores for each of the plurality of pixels represent a probability that the pixel is a part of an image of a road.

\* \* \* \* \*